UNITED STATES PATENT OFFICE.

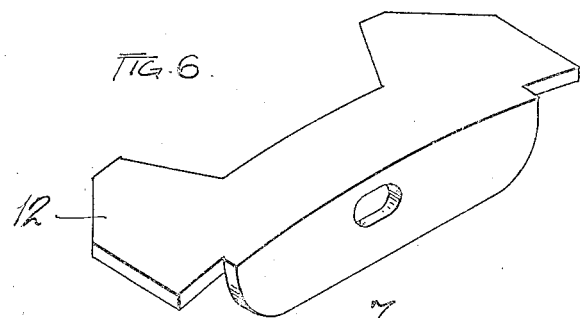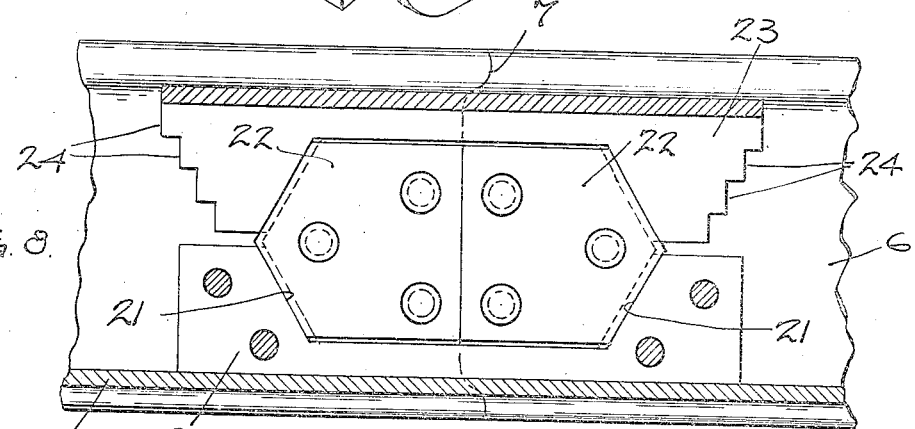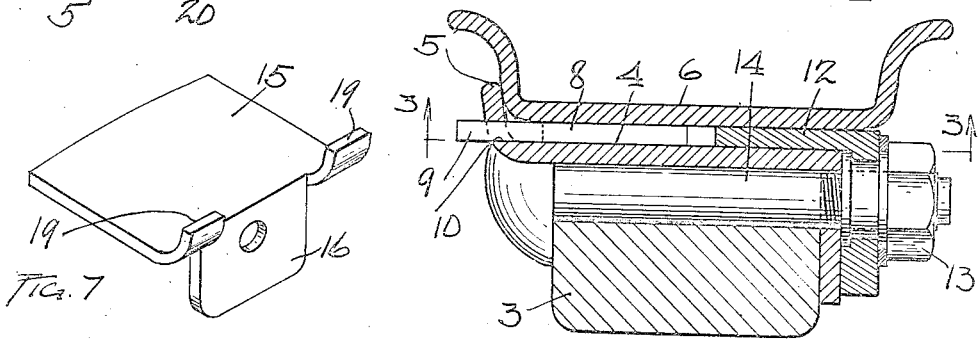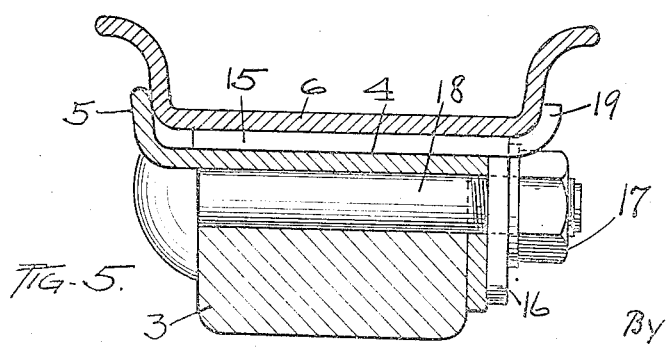

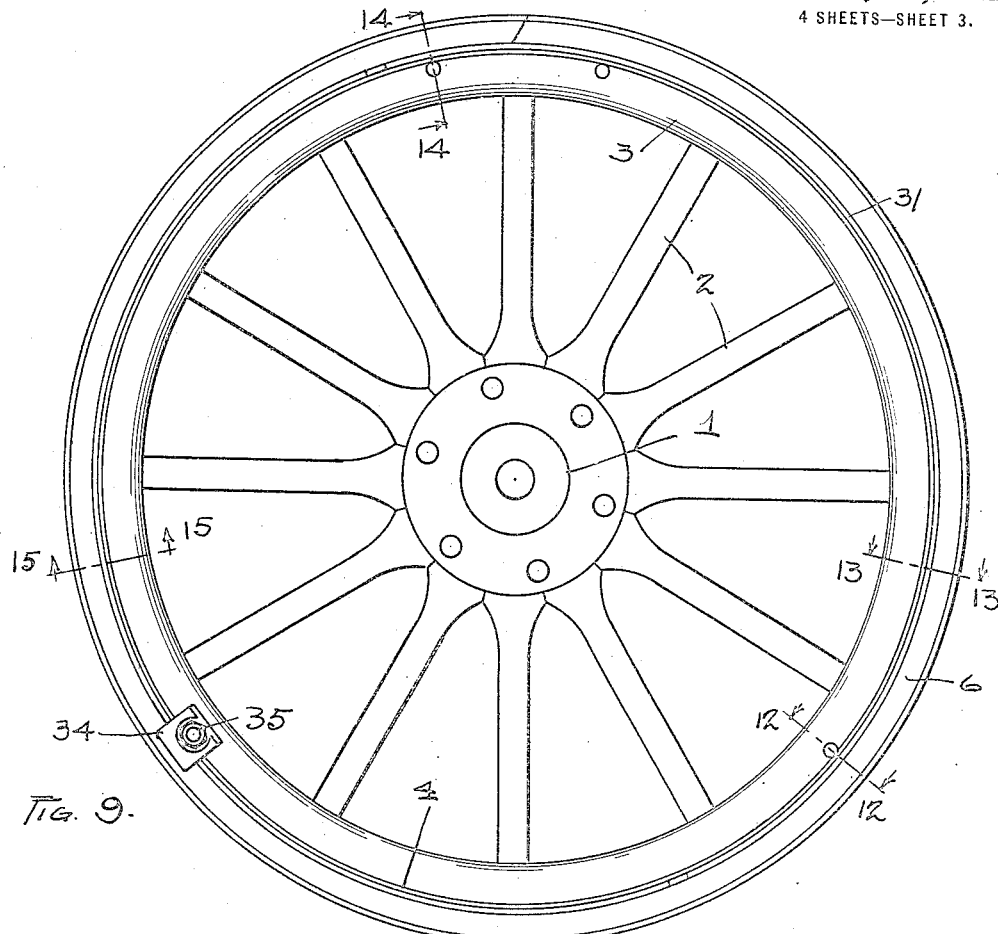
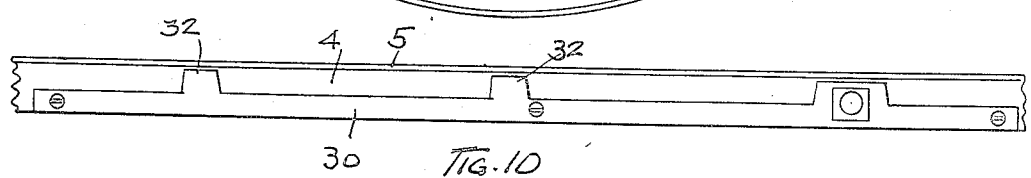
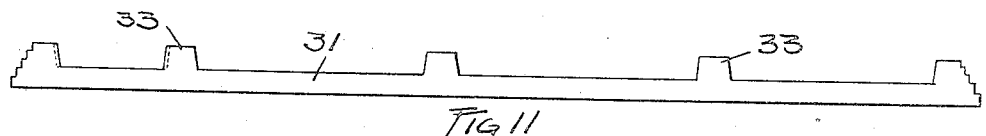
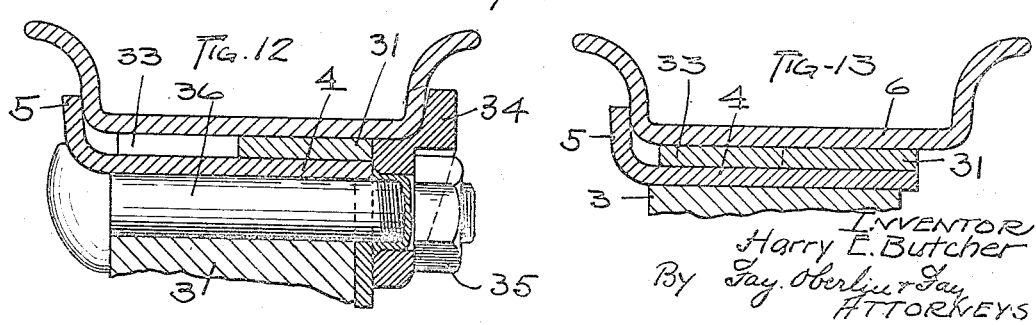

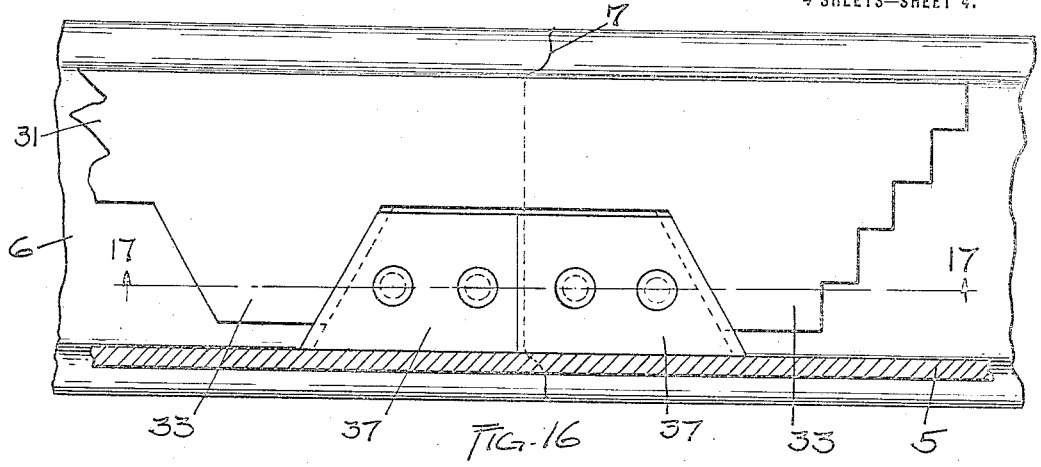
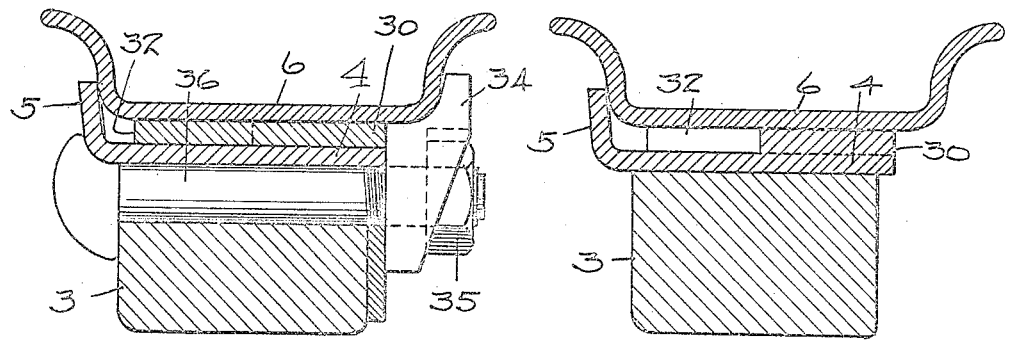
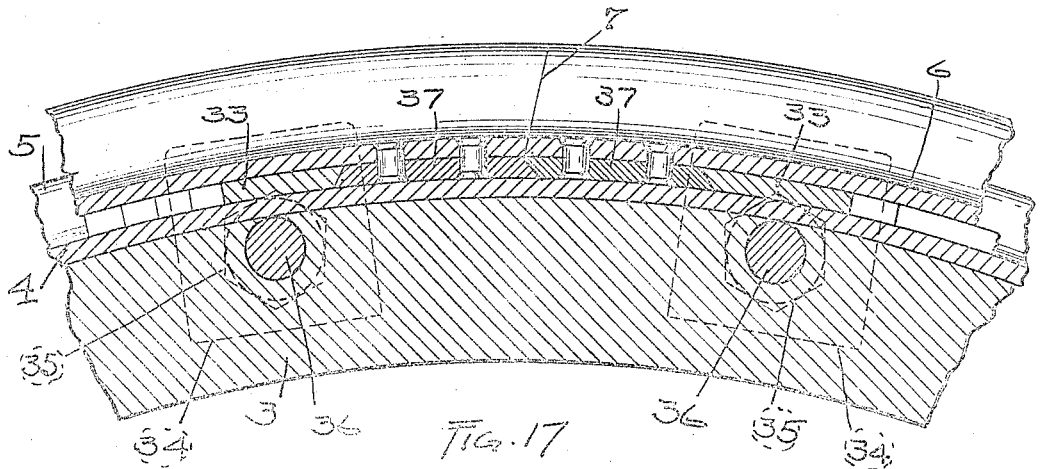

HARRY E. BUTCHER, OF CLEVELAND, OHIO, ASSIGNOR TO THE STANDARD PARTS COMPANY, OF CLEVELAND, OHIO, A CORPORATION OF OHIO.

DEMOUNTABLE VEHICLE WHEEL RIM.

1,422,661.

Specification of Letters Patent.   Patented July 11, 1922.

Application filed October 30, 1917. Serial No. 199,228.

*To all whom it may concern:*

Be it known that I, HARRY E. BUTCHER, a citizen of the United States, and a resident of Cleveland, county of Cuyahoga, and State of Ohio, have invented a new and useful Improvement in Demountable Vehicle Wheel Rims, of which the following is a specification, the principle of the invention being herewith explained and the best mode in which I have contemplated applying that principle, so as to distinguish it from other inventions.

The present improvements relate to co-operative means for demountably securing a vehicle wheel rim on the wheel body, and for locking together the ends of such rim where the latter is transversely split at one point in its circumference in order to render it collapsible, and thus facilitate the placing on and removal of a tire. The object of the invention is to provide for the solid seating of the rim on the felly or equivalent wheel body without the use of wedging agencies, and at the same time to lock together the ends of the rim, where the latter is split, as well as to tie or secure such ends to the wheel body. To the accomplishment of the foregoing and related objects, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
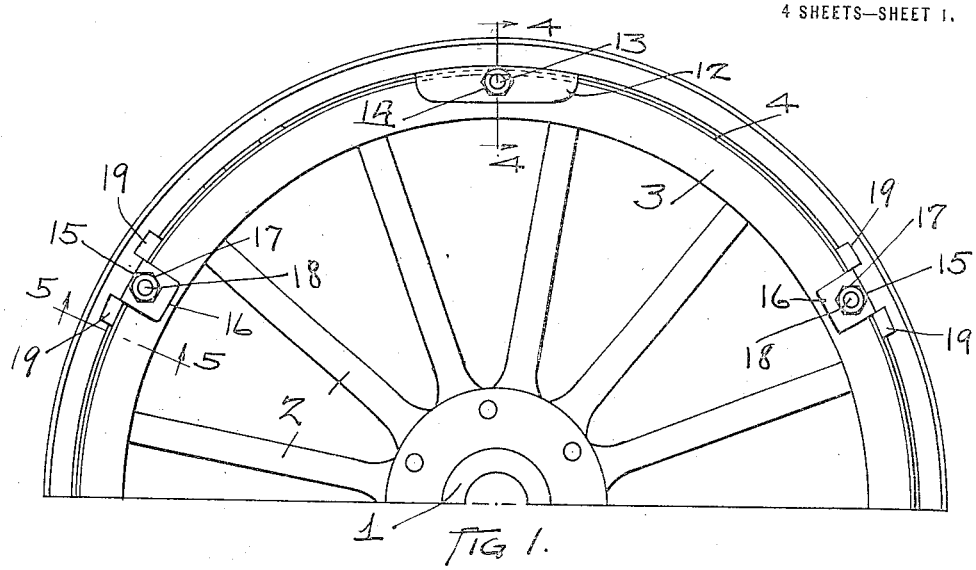
Figure 2:
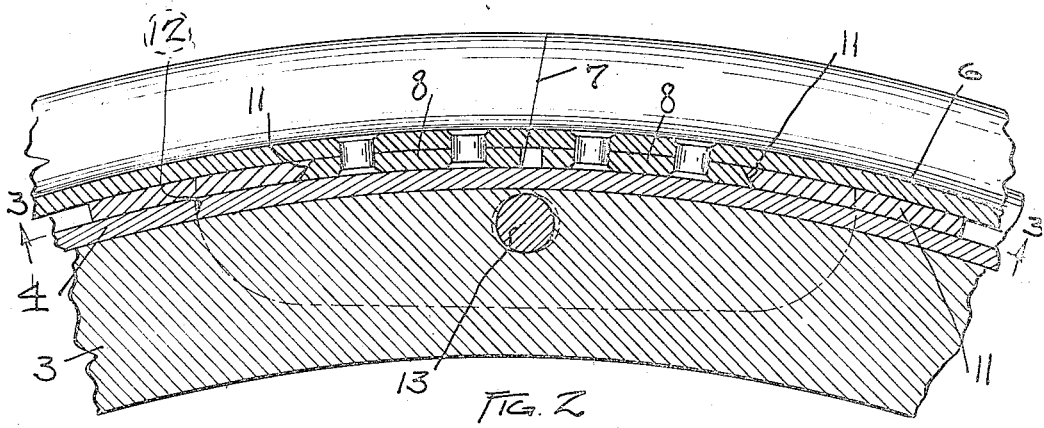
Figure 3:
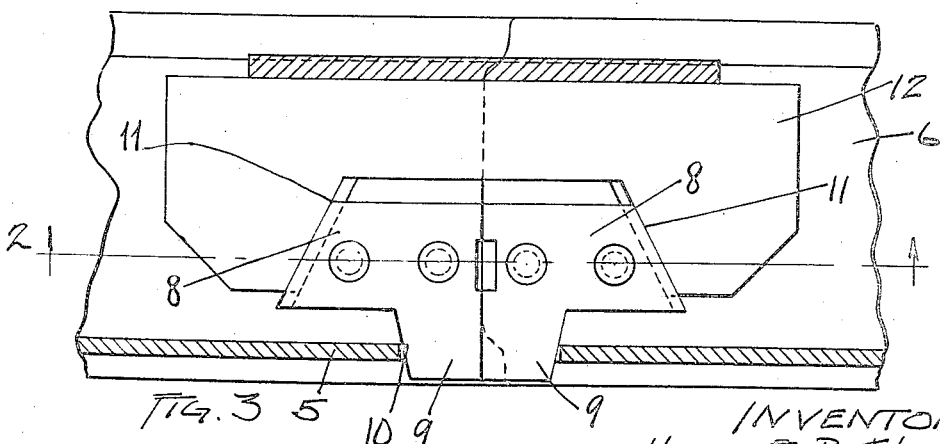

Figure 1 is a side elevation of a part of a wheel equipped with a demountable rim embodying my present improvements; Figure 2 is a longitudinal vertical section through such rim and a part of the felly; Figure 3 is a part section and part inside elevation of such rim, the plane of the section being indicated by the line 3—3, Figure 2; Figures 4 and 5 are transverse sections through the rim and felly, the planes of the sections being indicated by the lines 4—4 and 5—5, respectively, Figure 1; Figure 6 is a perspective view of one form of locking plate employed in connection with the foregoing rim structure; Figure 7 is a similar perspective view of another form of locking plate; Figure 8 is a part section and part inside elevation similar to that of Figure 3, but showing a modification in the construction of the rim-end locking device; Figure 9 is an elevation, with parts broken away, of a wheel equipped with still a different form of rim-end locking device, as well as with a modified form of demounting means; Figure 10 is a developmental view of the outer face of the felly band; Figure 11 is a similar developmental view of a clamping device employed in demountably seating a rim on the felly; Figures 12, 13, 14 and 15 are transverse sectional views of the rim and felly, taken on the planes indicated by the lines 12—12, 13—13, 14—14 and 15—15, respectively, Figure 9; Figure 16 is a part section and part inside elevation similar to Figures 3 and 8, but showing the modified construction of Figures 9 et seq.; and Figure 17 is a longitudinal vertical section of this last mentioned modification, the plane of the section being indicated by the line 17—17, Figure 16.

Referring, first of all, to the construction illustrated in Figures 1 to 7 inclusive, the wheel body there appearing is of typical construction, consisting of the usual hub 1, wooden spokes 2, and felly 3, supported by the outer end of the latter and surrounded by an encircling metal band 4. This felly band, in the present case, is formed on its rear side with an upstanding flange 5 that serves as a stop for the rim 6 in order to locate the latter centrally on the wheel body.

Such rim, as previously indicated, is of the transversely split type, being split at one point 7 in its circumference, preferably at a slight angle to the radial line passing through such point; and, secured to the respective ends of the rim contiguous to such split are two plates 8, 8 of similar but complementary form, the rear sides of which are formed with beveled projections 9, 9 adapted to engage in a recess or slot 10 in the flange 5 on the felly band (see Figures 3 and 4), and thereby tend to draw the rim-ends together. The outwardly disposed edges 11, 11 of these plates are likewise beveled, but in the opposite direction, and are furthermore undercut, as shown in Figures 2 and 3, so as to engage with the correspondingly beveled interior faces of a recessed plate 12, such faces being oppositely undercut.

This plate 12 is of the proper thickness and curvature to fit between the rim and felly band, so that it may be forced transversely of the latter until the faces in question thus engage with the undercut edges of the plates on the rim-ends. Said retaining plate is adapted to be thus moved by a swiveled clamp-nut 13 on a bolt 14 transversely mounted in the felly. The action of the plate at the same time will obviously force the rim 6 over against the flange 5 and bring the projections 9, 9 into wedging engagement with the slot 10 in such flange. As a result, the ends of the rim are not only drawn forcibly together, but are also tied down, in the most secure fashion possible, to the wheel body.

To force the other portions of the rim over against the stop flange, and at the same time provide a sufficiently solid seat for the rim, a series of clamping plates 15, such as shown in perspective in Figure 7, is employed. Each of these plates is formed with a downturned ear 16 adapted to receive a swiveled clamping nut 17 threaded on a bolt 18, in the same fashion as the nut 13, that serves to operate the above described plate 12, and is also formed with upturned ears 19 that are adapted to laterally engage with the outer edge of the rim, as shown in Figure 5. The main body of the plate, when the latter has been forced into position shown in the figure just referred to, is designed to fit snugly in the space between the rim and felly band, so as to afford a seat for the former, and at the same time, through the action of the upstanding ears, said rim is held tightly against the stop flange on the felly band.

In the modification illustrated in Figure 8 the felly band 4, instead of being provided with a slot to receive rearward projections on the plates adjacent the rim-ends, is provided with a recessed plate 20, having edges 21 of the recess undercut to engage with complementary edges on the plates 22, each of which has two angularly related undercut edges, one designed thus to engage with the fixed plate on the felly band, the other to be engaged by a transversely movable plate 23 fitting between the rim and felly band. The latter is in all respects similar to the one previously described and shown in Figure 6, except that its ends 24 are stepped, instead of merely slanting; this to facilitate the prying out of the plate by a screw-driver or like implement when it is desired to demount the rim.

In the second modification illustrated in Figures 9 et seq., instead of relying on clamp plates which are inserted between the felly band and rim to sustain the latter, I provide a raised supporting surface 30 on the felly band, that extends part way around the latter, as shown in Figures 9 and 10, and a segmental band 31 of somewhat similar form, that is adapted to be inserted just as the plates 15 are in the first described construction. Such segmental band is not intended to overlap the raised surface on the felly band, but the two together extend practically around the circumference of the felly band, so as to provide an adequate support for the rim. The raised surface and the segmental band include lateral projections 32 and 33, respectively, at spaced intervals and substantially equal to the width of the rim, and the band is forced into place transversely of the wheel body by means of clamp plates 34 swiveled onto nuts 35, that are in turn threaded on transversely disposed bolts 36 in the felly, the clamp plates being adapted to engage the corresponding side of the rim to force the same over against the stop flange 5 on the felly band.

The free ends of the segmental band 31 are preferably notched or stepped, as in the case of the plate illustrated in Figure 8, to facilitate the prying out of the band, and two of the lateral projections 33 adjacent one such end are spaced to engage with the outwardly disposed edges of complementary plates 37 attached to the respective rim-ends, as shown in Figure 16, it being understood that these lateral projections and such plates are formed with complementary undercut engaging edges so that the action of the projections on the band, when the latter is forced transversely of the rim, will be to draw the ends of the latter together, just as in the case of the plates shown in Figures 6 and 8.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a wheel; a demountable rim therefor of the transversely split type; a stop on said wheel adapted to locate said rim thereon; a transversely movable plate adapted to be inserted between said rim and wheel so as to support the former in spaced relation on the latter, said plate being formed to laterally engage said rim to force the same against said stop and also being formed to engage the ends of said rim and draw the same together; and other interengaging means on said wheel and rim-ends, respectively, adapted to draw the latter together.

2. The combination of a wheel; a demountable rim therefor of the transversely split type; a stop on said wheel adapted to locate said rim thereon; a transversely movable plate adapted to be inserted between said rim and wheel so as to support the former in spaced relation on the latter, said plate being formed to laterally engage said rim to force the same against said stop and also being formed to engage the ends of said rim and draw the same together; and other interengaging means on said wheel and rim-ends, respectively, adapted to draw the latter together, and at the same time tie such rim-ends radially to said wheel.

3. The combination of a wheel; a demountable rim therefor of the transversely split type; a stop flange on said wheel adapted to locate said rim thereon, said flange being slotted at one point; plates on the respective ends of said rim having outwardly beveled edges and also having oppositely beveled projections adapted to engage such slot and thereby draw said rim-ends together and at the same time tie them to the wheel; and a transversely movable plate adapted to be inserted between said rim and wheel so as to support the former in spaced relation on the latter, said plate being formed with complementary beveled edges to those on said first-named plates adapted to engage the same and thereby draw the rim-ends together.

4. A clamping plate for securing a demountable rim on a wheel, comprising a portion adapted to be inserted between said rim and wheel and support the former in spaced relation on the latter, spaced upturned portions adapted to laterally engage said rim, and an intermediate downturned portion adapted to be connected with suitable operating means.

Signed by me, this 25 day of October, 1917.

HARRY E. BUTCHER.

Attested by—
J. C. GRANT ERNACH.